Jan. 15, 1963    F. J. HIERHOLZER, JR    3,074,030
BRIDGE-TYPE INVERTER NETWORK
Filed Jan. 19, 1960    2 Sheets-Sheet 1

WITNESSES
Edwin E. Bassler
James F. Young

INVENTOR
Frank J. Hierholzer
BY
John L. Stoughton
ATTORNEY

Jan. 15, 1963  F. J. HIERHOLZER, JR  3,074,030
BRIDGE TYPE INVERTER NETWORK
Filed Jan. 19, 1960  2 Sheets-Sheet 2

United States Patent Office 3,074,030
Patented Jan. 15, 1963

3,074,030
BRIDGE-TYPE INVERTER NETWORK
Frank J. Hierholzer, Jr., Westport, Conn., assignor to Westinghouse Electric Corporation, East Pittsburgh, Pa., a corporation of Pennsylvania
Filed Jan. 19, 1960, Ser. No. 3,303
15 Claims. (Cl. 331—113)

This invention relates generally to networks for transferring unidirectional potential power into alternating potential power and is particularly adapted to such a network in which controlled diodes are used as the controlling valves.

Various types of networks have been used in the prior art to invert a direct potential to alternating potential, and these networks have included a bridge-type network in which electric triodes have been used to control the flow of current as well as electric valves of the transistor type. The transistor type controlling valves have certain advantages over the tubes in that there is less voltage drop thereacross, and also they do not require the electric heating power which is required by the electric valves or electric tubes. The transistor type electric valves, however, require a continuous control current so that the power required for this control current decreases the efficiency of the network.

It is an object of my invention to provide a new and improved inverter network which has increased efficiency.

Another object is to provide a network for inverting power at greater voltage and current levels than has heretofore been possible.

A further object of this invention is to provide such a network with a new and improved controlling device.

A further object of this invention is to provide such a network in which controlled diodes are used to control the current flow through the network.

A still further object is to provide such network which is highly reliable in operation.

Other objects will be apparent from the specification and claims and the drawings, in which drawings:

Figure 1:
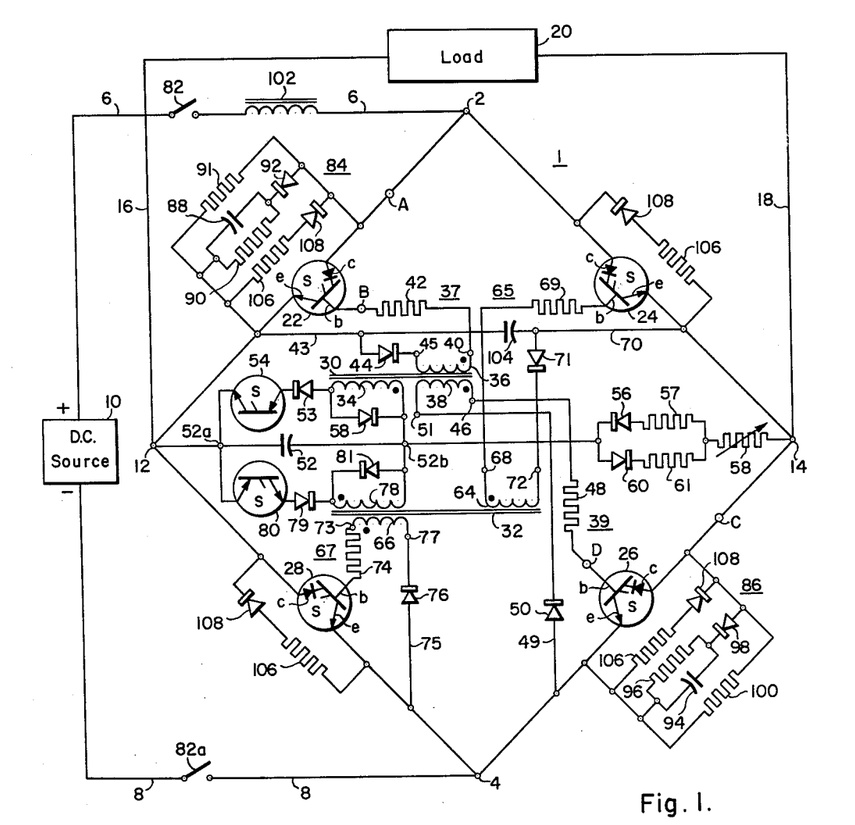
FIGURE 1 shows schematically an inverter network embodying the invention.

Referring to the drawings by characters of reference, the numeral 1 indicates generally a bridge-type inverter network having power supplying terminals 2 and 4 connected by means of conductors 6 and 8 to a suitable source of unidirectional potential 10. The bridge-type network 1 has a pair of output terminals 12 and 14 which are connected by conductors 16 and 18 respectively to the alternating current load 20. Current flow through each of the bridge arms is controlled by means of controlled diodes or four region triodes 22, 24, 26 and 28.

The controlled diodes or devices 22 and 24 respectively control current flow from the power terminal 2 to the output terminals 12 and 14 while the devices 26 and 28 similarly control the current flow from the output terminals 12 and 14 to the power terminal 4. Each of the devices 22, 24, 26 and 28 has a power circuit extending between a current input terminal or emitter $e$ through four semiconductor layers to a current output terminal or collector $c$. Initiation of current flow through the four region triodes is controlled by means of a control circuit which extends from the power terminal $e$ to a control terminal or electrode $b$.

A controlled diode or four region triode is a semiconductor device which may be of the PNPN, NPNP and PNPM types, among others, and which are sold by Westinghouse Electric Corporation under the trade name Trinistor. In this type of device the control circuit acts to control the rendering of the power circuit into its conducing condition but has no effect (under normal operating conditions) to interrupt the current flow in the power circuit. Current flow through the power circuit is interrupted only when the magnitude of the current flow therethrough decreases below a minimum critical value. In this respect it is very much like a thyratron or ignitron tube.

Figure 4:
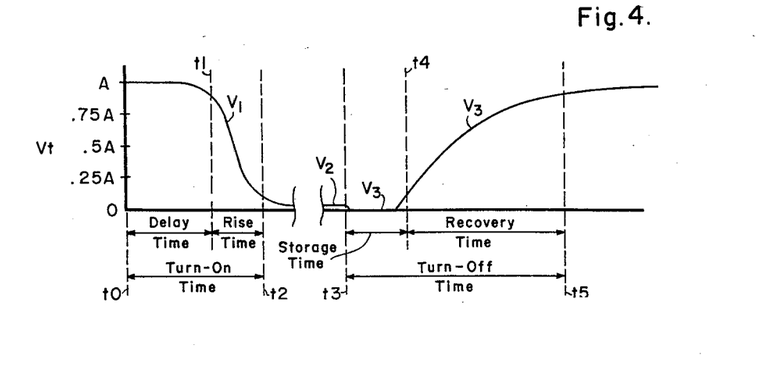
FIG. 4 shows schematically certain operating characteristics of a controlled diode which is usable in the network of FIGS. 1 and 3.

FIG. 4 illustrates a typical characteristic curve for a four region diode. The ordinate $V_t$ represents the breakover voltage at zero control current while the abscissa represents time starting $t_0$ which is the instant that a control current is applied to the control circuit. The curve $V_1$ represents the voltage across the power circuit during the "turn-on time," $V_2$ the voltage during "on time" and $V_3$ the voltage which must not be exceeded during the "turn-off time." The curves $V_1$, $V_2$ and $V_3$ are typical and their shapes may vary somewhat depending upon the magnitude of, and rate of rise of, the control current during "turn-on time" and upon the magnitude of the current through the power circuit just before the "turn-off time."

Breakover voltage is defined as that voltage which when applied across the power circuit of a controlled rectifier will cause it to conduct substantial current in the forward direction. As this control current is increased, the breakover voltage decreases.

Let us assume that the voltage magnitude A occurs with zero control current and that at time $t_0$ a voltage is applied to the control circuit. Current will build up in the control circuit at a determined rate. In the typical curve $V_1$, it is assumed that the wave shape of the control current is square and the current increases to its maximum value instantaneously. In actual practice some inductance will be present in the control circuit and the current will take a finite time to build up. Since any delay in current build up increases the interval $t_0$ to $t_1$, the circuit characteristics should be such as to cause full control circuit to flow in the minimum time. By proper choice of elements, this may be as low as 1 microsecond.

Time $t_1$ by definition is the time that the breakover voltage will have decreased to 90 percent of A. Time $t_2$ by definition is the time that the breakover voltage will have decreased to 10 percent of A. The time interval $t_0$ to $t_1$, which may be of the order of two microseconds, is defined as delay time while the interval $t_1$ to $t_2$, which may be of the order of .2 microsecond, is defined as rise time. The curve $V_1$ represents the time-voltage relationship of the voltage between the emitter and collector of a four region triode subjected to a source potential of the magnitude A.

The magnitude of the control current should always equal or exceed the base current which is required for full turn-on of the controlled diode with the minimum value of voltage across the power circuit which will cause the diode to initiate conduction. This value is sometimes called $I_{BF}$ by those skilled in the art. Sometime during the interval $t_2$ to $t_3$, the base or control current is terminated and as long as the current flowing in the power circuit does not decrease below a fixed minimum value, the diode will continue to conduct in much the same manner that an ignitron continues to conduct after the igniter has been deenergized.

The portion of the curve $V_3$ shows a typical breakover voltage characteristic of a controlled diode during "turn-off" which is accomplished by interrupting current flow through the power circuit by some means outside of the diode itself. Prior to time $t_3$ which is the start of "turn-off time," the current flow in the control or base circuit will have been terminated, and if the current flow in the power circuit is prevented for the time $t_3$ to $t_5$, the controlled diode itself will then prevent current flow provided, however, that the voltage across the power circuit is not greater than 90 percent of the maximum breakover voltage value A. Normally, the voltage applied to the circuit controlled by the trinistor is kept below 85 percent of A so that it is safely below the breakover voltage, and the controlled diode will not accidentally conduct without the application of control current.

Returning again to the circuit arrangement of FIG. 1, the collectors $c$ of the devices 22 and 24 are connected to the power terminal 2 while the emitters $e$ thereof are connected to the load terminals 12 and 14 respectively. The collectors $c$ of the devices 26 and 28 are connected respectively to the output terminals 14 and 12 while the emitters $e$ are connected together and to the power terminal 4. The pairs of devices 22—26 and 24—28 are alternately rendered conducting for energizing the output terminals 12, 14 in one polarity and then in the opposite polarity from the source 10 to provide a source of alternating potential for the load 20.

In order to accomplish the turning on of the pairs of devices 22—26 and 24—28, a pair of firing or control transformers 30 and 32 are provided. The firing transformer 30 has a primary winding 34 and a pair of secondary windings 36 and 38. The secondary windings 36 and 38 are connected to energize the control circuits 37 and 39 of the devices 22 and 26, respectively. The control circuit 37 extends from one terminal 40 of the winding 36 through a current limiting resistor 42, the base $b$ of the device 22, the emitter $e$ thereof, a conductor 43 and a rectifier 44 to the other terminal 45 of the winding 36. Similarly, the control circuit 39 extends from one terminal 46 of the winding 38 through a current limiting resistor 48, the base $b$ of the device 26, the emitter $e$ thereof, a conductor 49 and a rectifier 50 to the other terminal 51 of the winding 38. The rectifiers 44 and 50 prevent any substantial reverse current flow through the circuits 37 and 39.

The primary winding 34 of the transformer 30 is connected across a firing or timing capacitor 52 in series with a rectifier 53 and a four region diode 54. The diode 54 prevents energization of the transformer 30 until the capacitor 52 has been charged to a critical potential. When the potential across the capacitor 52 reaches a critical value, the diode 54 breaksover and the capacitor 52 discharges through the winding 34 to provide a steep wave front of voltage in the windings 36 and 38. The rectifier 53 prevents any substantial reverse energization of the winding 34 when the capacitor is charged in the opposite polarity as will be described below. A diode rectifier 58, connected in shunt with the winding 34, reduces the voltage surge due to collapsing flux in the transformer 30.

One terminal 52a of the capacitor 52 is connected to load terminal 12. The other terminal 52b thereof is connected through a rectifier 56, a compensating resistor 57, and a current controlling resistor 58 to the load terminal 14 for charging of the timing capacitor 52 in a first direction when the load terminal 14 is positive with respect to the load terminal 12. A rectifier 60 and compensating resistor 61 are connected in shunt around the rectifier 56 and resistor 57 for charging the timing capacitor 52 in the opposite direction when the load terminal 12 is positive with respect to the load terminal 14.

Transformer 32 is provided with a pair of secondary windings 64 and 66 which are connected respectively into the control circuits 65 and 67 of the controlled diodes 24 and 28. The control circuit 65 extends from the terminal 68 of the winding 64 through a current limiting resistor 69, the base $b$ of diode 24, emitter $e$ thereof, conductor 70 and rectifier 71 to the other terminal 72 of the winding 64. Likewise, the control circuit 67 for the diode 28 extends from one terminal 73 of the winding through a current limiting resistor 74, base $b$ of the diode 28, emitter $e$ thereof, conductor 75, and rectifier 76 to the other terminal 77 of the winding 66. The primary winding 78 of the transformer 32 is connected in series with a rectifier 79 and a four region diode 80 across the terminals 52a and 52b of the capacitor 52 in the same manner as is winding 34 except that the polarities of rectifier 79 and diode 80 are reversed with respect to 53 and 54 so that the diode 80 will breakover and discharge the capacitor 52 through the winding 78 when terminal 52a is positive with respect to terminal 52b. The winding 78 is shunted by a rectifier 81 similar to the rectifier 58.

A starting circuit is provided for the network 1 which acts to initially charge the capacitor 52 in a polarity to render its terminal 52a positive with respect to its terminal 52b after which the network 1 continues to oscillate due to operation of the firing circuits above described. For this purpose there is provided a pair of shunting networks 84 and 86 about the controlled diodes 22 and 26. The network 84 includes a capacitor 88 connected in parallel with a resistor 90. This network 88—90 is connected in series with a rectifier 92 and the resulting circuit is connected between the emitter $e$ and collector $c$ of the device 22. A resistor 91 is also connected between emitter $e$ and collector $c$ of the device 22 and completes the network 84. The network 86 is similar to the network 84 and includes a parallelly connected capacitor 94 and resistor 96, which network 94—96 is in series with a rectifier 98. The network 86 further includes a shunting resistor 100 connected between the emitter $e$ and collector $c$ of the device 26.

It is believed that the remaining details of construction may best be described in connection with the description of operation which is as follows: upon closure of the disconnect switches 82 and 82a, potential is applied between the input terminals 2 and 4. Since under this condition, the capacitors 88 and 94 will have been discharged, current will flow from the source 10 through conductor 6, disconnect switch 82, inductive reactor 102, terminal 2, the rectifier 92, capacitor 88, terminal 12, capacitor 52, rectifier 60, resistor 61, terminal 14, rectifier 98, capacitor 94, the terminal 4, the conductor 8 and disconnect switch 82a to the negative terminal of the source 10. Some current, of course, will also flow through the load 20; however, the majority of the current will be through the capacitor 52 as above described. The magnitudes of the capacitors 88 and 94 with respect to that of the capacitor 52 and the load 20 are such that the capacitor 52 will be charged to a critical potential prior to the time that the capacitors 88 and 94 become fully charged.

When the capacitor 52 receives its critical charge, the four region diode 80 will breakover permitting the capacitor 52 to discharge through the primary winding 78 of the transformer 32. This discharge current momentarily energizes the secondary windings 66 and 64 thereof to cause control current to flow in the control circuits 65 and 67 of the devices 24 and 28. These devices quickly become conductive and current will then flow from the terminal 2 through the device 24, terminal 14, load 20, terminal 12, device 28 and terminal 4 back to the negative terminal of the D.C. source 10. As soon as the devices 24 and 28 conduct, terminal 12 is effectively connected to terminal 4 and terminal 2 is effectively connected to terminal 14. This causes load current to flow in one polarity and causes the capacitors 88 and 94 to rapidly charge to the full potential of the D.C. source 10 and causes the capacitor 52 to charge in a polarity opposite to the polarity to which it was charged when devices 22 and 26 were conducting as described above.

The resistors 90 and 96 are large relative to the load impedance so that the current flowing therethrough, with controlled diodes 24 and 28 conducting, is a small portion of the load current. Likewise, resistors 91 and 100 will be large in comparison to the load impedance for similar reasons. During the periods when diodes 22 and 26 are conducting, there will be substantially no voltage drop across these diodes and the capacitors 88 and 94 will commence to discharge through the resistors 90 and 96, respectively. The value of these resistors should be high enough to prevent any substantial discharging during this period. The resistors 91 and 100 are necessary to remove the voltage of the capacitors 88 and 94 from across the power circuit of the controlled diodes 22 and 24 to permit their turning off during normal oscillation of the network 1. Without the resistor 91 and with no current flowing through the device 22, the capacitor 88 could maintain a substantial voltage across the power circuit of device 22 because of the reverse direction conduction of the rectifier 92. The resistance value of the resistor 90 is much less than the value of the reverse resistance of the rectifier 92 (approximately 1/10) so that the drop thereacross, which is the potential across the power circuit of the device 22, is a small portion of the potential to which the capacitor 88 is charged irrespective of the other circuit impedances through which the capacitor 88 might otherwise discharge.

When the capacitor 52 reaches its critical charge, the four region diode 54 will break down and the capacitor 52 will discharge through the winding 34. When this occurs, the windings 36 and 38 energize the control circuits of the devices 22 and 26 whereby they rapidly become conductive to connect the terminal 12 to terminal 2, and the terminal 14 to terminal 4. It will be noted that upon initial closure of the disconnect switches 82 and 82a, the starting networks 84 and 86 conducted current to charge the timing capacitor 52 for turn-on of the devices 24 and 28. The devices 22 and 26, however, did not conduct, and, therefore, it was unnecessary to render these devices 22 and 26 nonconductive upon conduction of the devices 24 annd 28 as above described. However, when the devices 22 and 26 are rendered conducting, the devices 24 and 28 must be rendered nonconducting. If this did not occur, the terminals 2 and 4 would be shorted through a pair of circuits, comprising the devices 22 and 28 and the devices 24 and 26.

Due to inherent differences in four region triodes or controlled diodes and in the various circuit elements which are utilized in the network 1, one of the diodes 22 or 26 will commence to conduct prior to the other thereof. For purposes of discussion let us assume that it is the diode 22 which conducts prior to the diode 26. When this occurs, a momentary short circuit appears between the terminals 2 and 4 through the diodes 22 and 28. Current from the source 10, however, is prevented from markedly increasing due to the presence of the current controlling reactor 102 which is of sufficient magnitude to prevent a substantial current increase for the time period required to render diode 26 conductive and diode 28 nonconductive.

During the interval of conduction of the diodes 24 and 28, capacitor 104, connected between terminals 12 and 14 by the conductors 43 and 70, was charged with its terminal which is connected to conductor 70 positive with respect to its terminal which is connected to the conductor 43. Conduction of diode 22 completed a discharge circuit for the capacitor 104 reversedly through the diode 24 and forwardly through the diode 22. This caused a reverse voltage and current to be applied to the previously conducting diode 24 which quickly renders the diode 24 nonconducting. The current which reversedly flows through the diode 24 acts to disperse rapidly the carriers within the four region triode at the junctions thereof. The reverse current flow may be of substantial magnitude and may under certain instances be greater than the load current. It is, however, of very short duration. Since a four region triode may be damaged by the application of an excessive reverse voltage across its emitter and collector, a voltage limiting network is provided for each four region triode. Each network includes a current limiting resistor 106 and a rectifier 108.

As the carriers in the triode 24 are dispersed due to reverse current flow therethrough, the reverse voltage across its power circuit increases. As this reverse voltage increases, current of increasing magnitude flows through the resistor 106 and rectifier 108. The magnitude of the resistance of the resistors 106 is so chosen that within the reverse current magnitudes provided by the commutating capacitor 104, the voltage between the collector c and emitter e of any four region triode will not exceed the maximum permissible reverse voltage. The reverse voltage needs to be supplied across the triode 24 for only the duration of its "turn-off time" as illustrated in FIG. 4. Thereafter in the absence of the application of a control current to the base circuit 65, diode 24 will continue to remain nonconductive since the voltage of the source 10 is less than 90 percent of the value A or value of the forward breakover voltage of the controlled diode.

During or after the rendering of the diode 24 nonconducting, the diode 26 will commence to conduct. This establishes a discharge circuit for the commutating capacitor 104 through the diodes 26 and 28. The polarity of the potential of, and the current flow established by, the commutating capacitor 104 is in the forward direction with respect to diode 26 but in the reverse direction with respect to diode 28, and the diode 28 is rendered nonconductive as described in connection with diode 24.

When commutation is complete, the diodes 22 and 26 will be the only two conducting controlled diodes, and the terminal 12 will be maintained positive with respect to the terminal 14 supplying potential to the load 20. Capacitor 52 begins to charge, and when it again reaches its critical voltage, the four region diode 80 will conduct causing the capacitor 52 to discharge through the winding 78 whereby the windings 64 and 66 thereof render the controlled diodes 24 and 28 conducting. Conduction of these two diodes will cause the previously conducting diodes 22 and 26 to be rendered nonconducting substantially as described above.

The network 1 will continue to supply a power to the terminals 12 and 14 in alternating polarity at a frequency determined by the magnitude of the capacitor 52 and of the resistor 58. If the magnitude of the resistance of resistor 58 is increased, it will slow down the charging rate of the capacitor 52 thereby reducing to output frequency of the inverter 1. If the value of the resistance is decreased, the output frequency is increased.

The resistors 57 and 61 compensate for any differences in the breakover voltage of the four region diodes 54 and 80 and are normally so arranged that the time interval required for the capacitor 52 to charge up and discharge through the diode 54 is the same time interval as required for it to charge up and discharge through the diode 80 whereby the lengths of the two half cycles of output voltage at the terminal 12 and 14 will be equal. At times it may be desirable to have the load 20 energized with polarity of one potential for a longer time period than it is with the polarity of the opposite potential. This result may be accomplished by changing the relative values of the resistances 57 and 61.

Figure 2:
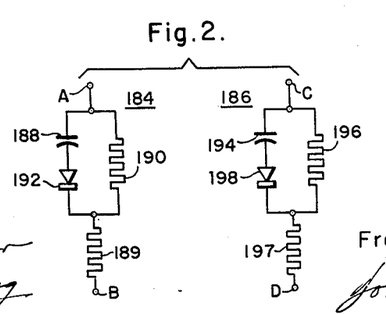
FIG. 2 shows schematically a modified form of starter network for use in the inverter network of FIG. 1.

In FIG. 2, there is shown a modified form of starting circuit for use with the inverter network of FIG. 1. In this instance, the networks 84 and 86 would be omitted and networks 184 and 186 would be used in their place. As indicated by the reference characters, the networks 184 and 186 would be connected into the network 1 at the points indicated by the reference characters A, B, C and D. The networks 184 and 186 each comprise two parallelly connected legs connected in series with a resistor (189 and 197). One of the legs of each of the networks includes a capacitor (188 and 194) series connected with a rectifier (192 and 198). The other leg of each of the networks comprises a resistor (190 and 196).

The network 1 is energized by closure of the disconnect switches 82 and 82a and oscillation of the network is initiated by means of the networks 184 and 186. Upon closure of the disconnect switches 82 and 82a, current will flow from the terminal 2 through the network 184, the control circuit of the triode 22, terminal 12, capacitor 52, diode 60, resistor 61, resistor 58, terminal 14, point C, network 186, the control circuit of the triode 26 to the negative terminal 4 which is connected to the D.C. source 10. The major portion of this current is the charging current of the capacitors 188 and 194. These capacitors are of relatively small capacity and their magnitude so chosen that the time required to raise the potential of each thereof to slightly less than one-half of the potential of the direct voltage source 10 is substantially the "turn-on time" of the triodes 22 and 26. Once the triodes 22 and 26 turn on, the starting networks 184 and 186 are no longer used, and the network 1 oscillates substantially as described above.

Care should be exercised in the selection of the capacitors 188 and 194 and the resistors 189 and 197 to insure that the timing relationship set out above is substantially attained. If not, false firing of the triodes 22 and 26 may result. In this regard, it will be appreciated that when the triode 22 turns on, the potential difference between the points A and B is substantially reduced to zero as is the potential between the points C and D upon conduction of the triode 26. When this occurs, no further charging of the capacitors 188 and 194 occurs and the potential across the capacitors 184 and 194 remains substantially at slightly less than one-half that of the source 10.

When the timing capacitor 52 subsequently receives its critical charge and discharges through the primary winding 78 of the transformer, the triodes 24 and 28 become conductive and the triodes 22 and 26 are rendered nonconducting. Rendering of the triodes 22 and 26 nonconducting with triodes 24 and 28 conducting places substantially full line voltage between the points A and B as well as between the points C and D. During this interval, the rectifiers 192 and 198 have prevented the capacitors 188 and 194 from discharging substantially, and the potential across the capacitors 188 and 194 remains at about half that of the source 10. The capacitors 188 and 194 will now draw charging current and charge up to substantially a full line potential.

If the magnitude of this charging current is not maintained substantially less than the magnitude of the control current required to turn on the triodes 22 and 26, they would become conductive and result in short-circuiting of the network 1. However, by permitting the capacitors 188 and 194 to obtain substantially half of their charge during the initial turn-on of the triodes 22 and 26, this subsequent flow of charging current is small enough so that it will not cause these four region triodes to become conductive.

The rectifiers 192 and 198 are preferably silicon diodes and inherently have a low amount of back current flow. The magnitude of resistance of the resistors 190 and 196 is low with respect to the reverse resistance of the diodes 192 and 198. A satisfactory ratio would be 1 to 10. With this construction the reverse current flow through the diodes 192 and 198 is ineffective to establish a sufficient potential difference between the points A and B to cause a destructive breakdown of the four region triode, less than that which may exist across the doides 192 and 198 when the capacitors are charged to line potential. The magnitude of the resistors 190 and 196 is so proportioned to the reverse resistance of the rectifiers that the major portion which is the terminal voltage of the networks 184 and 186 respectively were insufficient to prevent triodes 22 and 26 from being turned off in response to the rendering of the triodes 24 and 28 conductive.

Figure 3:
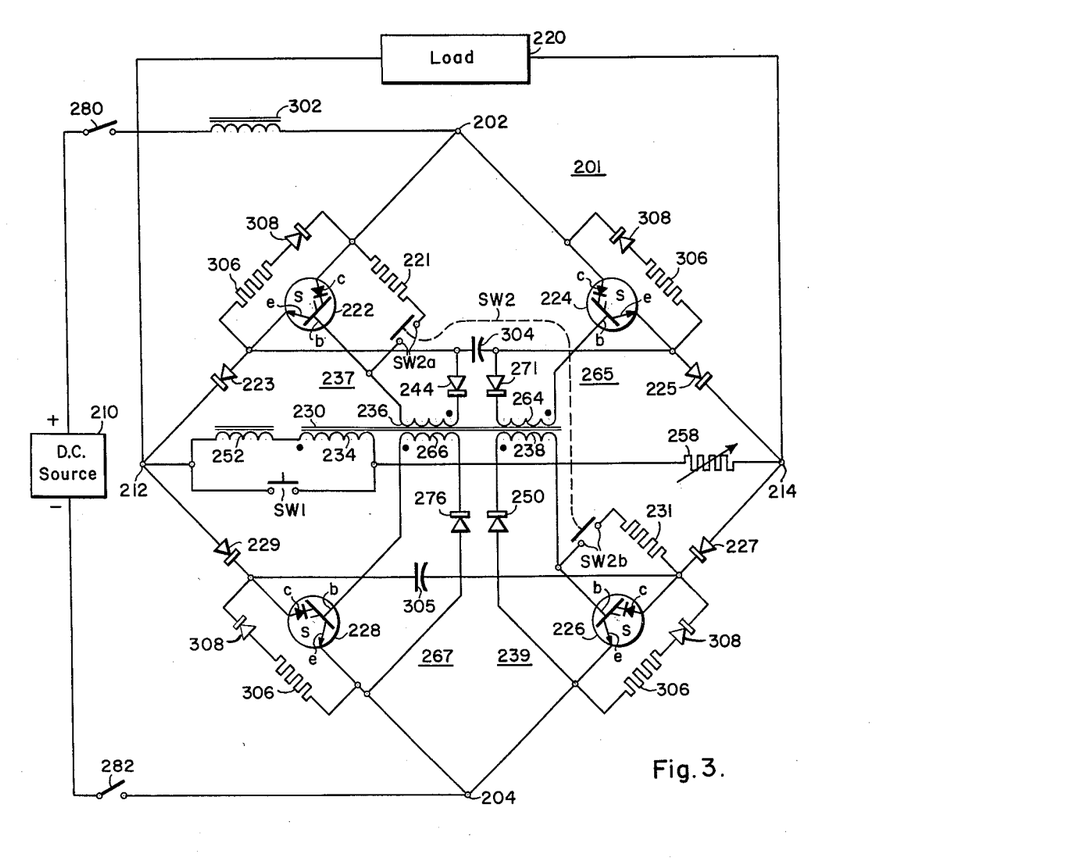
FIG. 3 is a schematic form of a modified form of the inverter network of FIG. 1 embodying my invention.

In FIG. 3 there is shown an inverter network 201 which as far as the power conducting elements are concerned is very much like that of FIG. 1. The control circuit of the network 201 is, however, somewhat different and operates in accordance with the saturating time of a saturating core inductor. With this arrangement, only a single control transformer 230 is provided, and the primary winding 234 thereof is connected in series with a saturating core-type inductor 252. The material of the core of the inductor 252 is preferably of the square type hysteresis loop so that the inductor 252 will saturate abruptly and a steep wave front of control current will flow to the winding 234. This will provide a steep wave front of control current in the control circuits of the triodes 222—226 or 224—228 as the case may be.

The windings 236, 238, 264 and 266 which energize the control circuits 237, 239, 265 and 267, respectively are all inductively coupled with the core of the transformer 230, instead of being divided between two different transformers as is the case in FIG. 1. In order that the control circuits will be energized in pairs 237—239 or 265—267, the windings are polarized with respect to the primary winding 234 such that when current flows through the winding 234 as a consequence of the conduction of the triodes 222 and 226, the control circuits 265 and 267 are energized to render the triodes 224 and 228 conducting. When the winding 234 is energized as a consequence of the conduction of the triodes 224 and 228, the control circuits 237 and 239 are energized to render the triodes 222 and 224 conductive. Current in the reverse direction through the control circuits 237, 239, 265 and 267 is prevented by the rectifiers 244, 250, 271 and 276, respectively.

The power portion of the network 201 is provided with unilateral conducting devices which may be rectifiers 223, 225, 227 and 229 which tend to isolate the commutating capacitors 304 and 305 from the load 220. The rectifier 223 is connected between the emitter e of the triode 222 and the terminal 212, the rectifier 225 is connected between the emitter e of the triode 24 and the output terminal 214, and the rectifiers 227 and 229 are connected respectively between the terminal 214 and the triode 226 and between the output terminal 212 and the triode 228. Because of the presence of the rectifiers 223 and 225, current from the commutating capacitor 304 acts to commutate only the triodes 222 and 224. The commutating capacitor 305 is connected between the collectors c and because of the rectifiers 227 and 229 commutates only the triodes 226 and 228.

The starting circuit of FIG. 3 comprises two manually controlled switches SW1 and SW2. The switch SW1 is connected in shunt across the series circuit comprising the saturable reactor 252 and transformer winding 234. One set of contacts SW2a of the switch SW2 acts upon closure to connect the base circuit of the triode 222 to the positive terminal 202. A current limiting resistor 221 is provided to limit the current flow through the base circuit. Likewise, the switch SW2 has a second set of contacts SW2b which, upon closure, connect the base of the triode 226 through the diode 227 to the load terminal 214. Current flow through this circuit is limited by a resistor 231.

After potential is applied to the power terminals 202 and 204 as a consequence of closure of the switches 282 and 280, oscillation of the inverter 201 is initiated by first closing the starting switch SW1 and thereafter closing the starting switch SW2. It is necessary that the starting switch SW1 be closed before the starting switch SW2 is closed because the timing inductor 252 and the transformer 230 must not operate to control the triodes until the switch SW2 is opened. As long as switch SW1 is held closed, the transformer 230 cannot become energized and a delay in opening of the switch SW2 is not deleterious. If desired, of course, the switches SW1 and SW2 could be combined into a single switch in which the contacts of the switch SW1 would close before the contacts SW2a and SW2b and would not open until after opening of the contacts SW2a and SW2b.

Assuming that the switch SW1 has closed, closure of the switch SW2 closes its contacts SW2a and SW2b, and current then flows from the terminal 202 through the resistor 221, contacts SW2a, base-to-emitter in the triode 222, diode 223, terminal 212, switch SW1, resistor 258, terminal 14, rectifier 227, resistor 231, contacts SW2b, base-to-emitter in the triode 226 to the negative power terminal 204. Current flow through the control circuits 237 and 239 of the triodes 222 and 226 cause these triodes to conduct and connect the terminal 212 to the terminal 202, and the terminal 214 to the terminal 204. Thereafter, the switch SW2 is permitted to open its contacts SW2a and SW2b, and subsequently the switch SW1 is also opened whereby potential which appears between terminals 212 and 214 is applied across the inductive reactor 252.

During the time interval required to saturate the reactor 252, the current flow through the control circuit is small with substantially all of the voltage appearing across the reactor 252. At the end of a predetermined time time interval, the reactor 252 will saturate. This substantially decreases the impedance of the control circuit causing an increased current to flow through the winding 234 and energize the transformer 230. As stated above, the polarity of the windings is such that current flows in the control circuit of the nonconducting pair of four region triodes when the reactor saturates and is prevented from flowing in the control circuit of the conducting pair of four region triodes. The initiation of conduction of a pair of triodes results in the rendering of the previously conducting pair nonconductive in a manner substantially the same as described in connection with FIG. 1. The main point of difference is that the capacitor 304 commutates the triode 222 or 224 as the case may be, and the capacitor 305 commutates the triode 226 or 228. This system requires two capacitors but each may be of lesser capacity than that of the capacitor 104 of FIG. 1.

The term four element triode or controlled diode has been used. Those terms are intended to embody all discontinuous control type solid-state thyratrons. Examples of such devices are disclosed in an article entitled "Solid-State Thyratrons" which appeared in Electronics for March 6, 1959. The term rectifier is intended to include unidirectional current flow devices of all types whether of the solid-state type or of the tube type unless indicated to the contrary.

There has been described and illustrated only a limited number of embodiments of the invention, and these are intended to be illustrative of the invention rather than limitative. Since other modifications may be made which come within the generic invention, the limits of the invention are to be determined by the scope of hereinafter appended claims.

What is claimed and is desired to be secured by United States Letter Patent is as follows:

1. In an inverter network, a pair of input terminals adapted to be energized from a source of unidirectional potential, a pair of output terminals, a plurality of discontinuous control type semiconductor devices, each said device having a power circuit and a control circuit and being of the type in which said control circuit is normally ineffective to interrupt current flow through said power circuit, a first and second electrical path interconnecting said terminals for flow of energy from said input to said output terminals, said first path including at least a first of said devices, a second of said paths including at least a second of said devices, a timing network connected to be energized by a potential which is a function of the potential between said output terminals and including an energy storage device and a plurality of output circuits, said storage device being characterized by the fact that it prevents substantial current flow therethrough during an initial time interval until it reaches a predetermined charge after which it permits substantial current flow therethrough, means individually connecting an individual one of said output circuits to each of said control circuits, said output circuits being so polarized that upon charging of said storage device to said predetermined charge due to conduction of said first path said semiconductor devices associated with said second path are rendered conductive and so polarized that upon charging of said storage device to said predetermined charge due to conduction of said second path said semiconductor devices associated with said first path are rendered conductive, said energy storage device being chargeable as a consequence of energy flow through said first path, said timing network being effective as a consequence of the charging of said storage device to a predetermined magnitude to energize said output circuits associated with said semiconductor devices of one of said paths.

2. A control circuit for an inverter network in which power from a source of unidirectional potential is supplied to a pair of output terminals through a pair of current flow paths under control of solid-state thyratrons comprising, an iron core saturable reactor having a reactor winding, a transformer having a primary winding and a plurality of secondary windings, an impedance device, means connecting said reactor winding and said primary winding and said impedance device for energization by said inverter network with a potential which is a function of that between said output terminals, means individually connecting individual ones of said secondary windings to individual ones of said thyratrons, an energy storage device, means connecting said storage device to be charged as a consequence of conduction of one of said paths, and means connecting said storage device for discharging through one of said thyratrons of said one path as a consequence of the conduction of the other of said paths.

3. A control circuit for an inverter network in which power flow from a source of unidirectional potential is supplied to a pair of output terminals through a pair of current flow paths under control of solid-state thyratrons comprising, an iron core saturable reactor having a reactor winding, a transformer having a primary winding and a plurality of secondary windings, an impedance device, means connecting said reactor winding and said primary winding and said impedance device for energization by said inverter network with a potential which is a function of that between said output terminals, means individually connecting individual ones of said secondary windings to individual ones of said thyratrons, an energy storage device, means connecting said storage device to be charged as a consequence of conduction of one of said paths, means connecting said storage device for discharging through one of said thyratrons of said one path as a consequence of the conduction of the other of said paths, and a shunt circuit connected in shunt with said one thyratron, said shunt circuit comprising a current limiting element and an asymmetric current conducting device.

4. A bridge-type inverter network comprising a pair of input terminals adapted to be energized from a source of unidirectional potential, a pair of output terminals adapted to be connected to supply energy to an alternating current load, a plurality of solid-state thyratron devices each having a power circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable energy storage means connected between at least two of said power circuits of said solid-state devices at portions thereof adjacent said output terminals, a plurality of asymmetric current flow devices, means individually connecting individual ones of said asymmetric devices in shunt with said power circuits of said solid-state devices, and means for alternately rendering conductive said first and second solid-state devices and said third and fourth devices.

5. A bridge-type inverter network comprising a pair of input terminals adapted to be energized from a source of unidirectional potential, a pair of output terminals adapted to be connected to supply energy to an alternating current load, a plurality of solid-state thyratron devices each having a power circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, a first capacitor connected between said power circuits of said first and said third solid-state devices, a second capacitor connected between said power circuits of said second and said fourth solid-state devices, said capacitors being connected to said power circuits at portions thereof adjacent said output terminals, a plurality of asymmetric current flow devices, said asymmetric devices being individually connected in series with said power circuits intermediate the point of connection of the respective said capacitor to said power circuit and said output terminal, a second plurality of asymmetric current flow devices, means individually connecting individual ones of said second asymmetric devices in shunt with said power circuits of said solid-state devices, and means for alternately rendering conductive said first and second solid state devices and said third and fourth devices.

6. A bridge-type inverter network comprising a pair of input terminals adapted to be energized from a source of unidirectional potential, a pair of output terminals adapted to be connected to said energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a firing transformer having a primary winding and a plurality of secondary windings, individual circuits individually connecting individual ones of said secondary windings to invidividual ones of said control circuits of said solid-state devices, each said just-named circuit including an asymmetric current flow device, an energy storage device, means connecting said last-named storage device and said primary winding for energization as a consequence of conduction of said solid-state devices, said last-named storage device acting to control the time at which said transformer is operable to energize said control circuits of said solid-state devices, said asymmetric devices in said control circuits being polarized such that said third and said fourth solid-state devices are rendered conductive as a consequence of the conduction of said power circuits of said first and said second solid-state devices and vice versa.

7. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a firing transformer having a primary winding and a plurality of secondary windings, individual circuits individually connecting individual ones of said secondary windings to individual ones of said control circuits of said solid-state devices, each said just-named circuit including an asymmetric current device, the asymmetric devices of said circuits associated with said first and second solid-state devices being polarized opposite to those associated with said third and fourth solid-state devices, a saturable reactor device, and means connecting said saturable reactor device and said primary winding in series circuit between said output terminals.

8. A bridge-type inverter network comprising a pair of input terminals adapted to be energized from a source of unidirectional potentials, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a firing transformer having a primary winding and a plurality of secondary windings, individual circuits individually connecting individual ones of said secondary windings to individual ones of said control circuits of said solid-state devices, each said just-named circuit including an asymmetric current device, the asymmetric devices of said circuits associated with said first and second solid-state devices being polarized opposite to those associated with said third and fourth solid-state devices, a saturable reactor device, means connecting said saturable reactor device and said primary winding in series circuit between said output terminals, and means for controlling the time required to saturate said saturable reactor.

9. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a first and a second firing transformer, each said transformer having a primary winding and a pair of secondary windings, a timing capacitor, a current regulating element, means connecting said regulating element and said timing capacitor in series circuit between said output terminals, individual circuits individually connecting said secondary windings of said first transformer to said control circuits of said first and said second solid-state devices and said secondary windings of said second transformer to said control circuits of said third and said fourth solid-state devices, a first and a second diode, a first and a second asymmetric current device, means connecting said primary winding of said first transformer across said timing capacitor and including said first diode and said first asymmetric device, said first diode and said first asymmetric device being polarized to permit discharging of said timing capacitor through said primary winding of said first transformer as a consequence of a predetermined charge on said timing capacitor of a first polarity, and means connecting said primary winding of said second transformer across said timing capacitor and including said second diode and said second asymmetric device, said second diode and said second asymmetric device being polarized to permit discharging of said timing capacitor through said primary winding of said second transformer as a consequence of a predetermined charge on said timing capacitor of a polarity opposite to said first polarity.

10. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a first and a second firing transformer, each said transformer having a primary winding and a pair of secondary windings, a timing capacitor, a current regulating element, means connecting said regulating element and said timing capacitor in series circuit between said output terminals, individual circuits individually connecting said secondary windings of said first transformer to said control circuits of said first and said second solid-state devices and said secondary windings of said second transformer to said control circuits of said third and said fourth solid-state devices, a first and a second diode, a first and a second asymmetric current device, means connecting said primary winding of said first transformer across said timing capacitor and including said first diode and said first asymmetric device, said first diode and said first asymmetric device being polarized to permit discharging of said timing capacitor through said primary winding of said first transformer as a consequence of a predetermined charge on said timing capacitor of a first polarity, means connecting said primary winding of said second transformer across said timing capacitor and including said second diode and said second asymmetric device, said second diode and said second asymmetric device being polarized to permit discharging of said timing capacitor through said primary winding of said second transformer as a consequence of a predetermined charge on said timing capacitor of a polarity opposite to said first polarity, and a starting circuit, comprising first and second circuit portions, each said circuit portion comprising in series a capacitor and an asymmetric current conducting device, said first and second circuit portions being individually connected in shunt with said first and second solid-state device.

11. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a first and a second firing transformer, each said transformer having a primary winding and a pair of secondary windings, a timing capacitor, a current regulating element, means connecting said regulating element and said timing capacitor in series circuit between said output terminals, individual circuits individually connecting said secondary windings of said first transformer to said control circuits of said first and said second solid-state devices and said secondary windings of said second transformer to said control circuits of said third and said fourth solid-state devices, a first and a second diode, a first and a second asymmetric current device, means connecting said primary winding of said first transformer across said timing capacitor and including said first diode and said first asymmetric device, said first diode and said first asymmetric device being polarized to permit discharging of said timing capacitor through said primary winding of said first transformer as a consequence of a predetermined charge on said timing capacitor of a first polarity, means connecting said primary winding of said second transformer across said timing capacitor and including said second diode and said second asymmetric device, said second diode and said second asymmetric device being polarized to permit discharging of said timing capacitor through said primary winding of said second transformer as a consequence of a predetermined charge of said timing capacitor of a polarity opposite to said first polarity, and a starting circuit, comprising first and second circuit portions, each said circuit portion comprising in series a capacitor and an asymmetric current conducting device, each said circuit portion further comprising a first impedance element connected in shunt with its said series connected capacitor and asymmetric device and a second impedance element connected in shunt with its said capacitor, said first and second circuit portions being individually connected in shunt with said first and second solid-state device.

12. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a first and a second firing transformer, each said transformer having a primary winding and a pair of secondary windings, a timing capacitor, a current regulating element, means connecting said regulating element and said timing capacitor in series circuit between said output terminals, individual circuits individually connecting said secondary windings of said first transformer to said control circuits of said first and said second solid-state devices and said secondary windings of said second transformer to said control circuits of said third and said fourth solid-state devices, a first and a second diode, a first and a second asymmetric current device, means connecting said primary winding of said first transformer across said timing capacitor and including said first diode and said first asymmetric device, said first diode and said first asymmetric device being polarized to permit discharging of said timing capacitor through said primary winding of said first transformer as a consequence of a predetermined charge on said timing capacitor of a first polarity, means connecting said primary winding of said second transformer across said timing capacitor and including said second diode and said second asymmetric device, said second diode and said second asymmetric device being polarized to permit discharging of said timing capacitor through said primary winding of said second transformer as a consequence of a predetermined charge on said timing capacitor of a polarity opposite to said first polarity, and a starting circuit, comprising first and second circuit portions, each said circuit portion comprising in series a capacitor and an asymmetric current conducting device, each said circuit portion further comprising a first impedance element connected in shunt with its said series connected capacitor and asymmetric device and a second impedance element connected in series with its said asymmetric device, said first circuit portion being connected between said control circuit of said first solid-state device and said first input terminal, said second circuit portion being connected between said control circuit of said second solid-state device and said second output terminal.

13. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a first transformer having a primary winding and a plurality of secondary windings, individual circuits individually connecting individual ones of said secondary windings to individual ones of said control circuits of said solid-state devices, each said just-named circuit including an asymmetric current device, the asymmetric devices of said circuits associated with said first and second solid-state devices being polarized opposite to those associated with said third and fourth solid-state devices, a saturable reactor device, means connecting said saturable reactor device and said primary winding in series circuit between said output terminals, a first switch connected in shunt with said series connected reactor device and primary winding, and a switch means having first and second portions, said first switch means portion acting upon closure to connect said first input terminal to said control circuit of said first solid-state device, said second switch means portion acting upon closure to connect said second output terminal to said control circuit of said second solid-state device.

14. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a first and a second firing transformer, each said transformer having a primary winding and a pair of secondary windings, a timing capacitor, a current regulating element, means connecting said regulating element and said timing capacitor in series circuit between said output terminals, individual circuits individually connecting said secondary windings of said first transformer to said control circuits of said first and said second solid-state devices and said secondary windings of said second transformer to said control circuits of said third and said fourth solid-state devices, a first and a second diode, a first and a second asymmetric current device, means connecting said primary winding of said first transformer across said timing capacitor and including said first diode and said first asymmetric device, said first diode and said first asymmetric device being polarized to permit discharging of said timing capacitor through said primary winding of said first transformer as a consequence of a predetermined charge on said timing capacitor of a first polarity, means connecting said primary winding of said second transformer across said timing capacitor and including said second diode and said second asymmetric device, said second diode and said second asymmetric device being polarized to permit discharging of said timing capacitor through said primary winding of said second transformer as a consequence of a predetermined charge on said timing capacitor of a polarity opposite to said first polarity, a diode rectifier connected in shunt with said primary winding of said first transformer, and a diode rectifier connected in shunt with said primary winding of said second transformer.

15. A bridge-type inverter network comprising a pair of input terminals adapted to be energized from a source of unidirectional potential, a pair of output terminals adapted to be connected to supply energy to an alternating current load, a plurality of solid-state thyratronic devices each having a power circuit and a control circuit, a first circuit means connecting a first of said input terminals to a first of said output terminals and including said power circuit of a first of said solid-state devices, a second circuit means connecting a second of said output terminals to a second of said input terminals and including said power circuit of a second of said solid-state devices, a third circuit means connecting said first input terminal to said second output terminal and including said power circuit of a third of said solid-state devices, a fourth circuit means connecting said first output terminal to said second input terminal and including said power circuit of a fourth of said solid-state devices, chargeable storage means connected between said power circuits of at least two of said solid-state devices at portions thereof adjacent said output terminals, a plurality of asymmetric current flow devices, means individually connecting individual ones of said asymmetric devices in shunt with said power circuits of said solid-state devices, a firing transformer having a primary winding and a plurality of secondary windings, individual circuits individually connecting individual ones of said secondary windings to indivual ones of said control circuits of said third and said fourth solid-state devices, each said just-named circuit including an asymmetric current flow device, an energy storage device, means connecting said last-named storage device and said primary winding for energization as a consequence of conduction of said solid-state devices, said last-named storage device acting to control the time at which said transformer is operable to energize said control circuits of said solid-state devices, said asymmetric devices in said control circuits being polarized such that said third and said fourth solid-state devices are rendered conductive as a consequence of the conduction of said power circuits of said first and said second solid-state devices.

References Cited in the file of this patent
UNITED STATES PATENTS

| | | |
|---|---|---|
| 1,947,093 | Knowles | Feb. 13, 1934 |
| 2,179,366 | Willis | Nov. 7, 1939 |
| 2,523,094 | Carleton | Sept. 19, 1950 |
| 2,872,582 | Norton | Feb. 3, 1959 |
| 2,925,546 | Berman | Feb. 16, 1960 |

OTHER REFERENCES

"Solid-State Thyratron Switches Kilowatts," by R. P. Frenzel and Gutzwiller; published in Electronics (March 28, 1958); pages 52–55 relied on.